Sept. 21, 1948.  W. A. KAISER  2,449,901
ELECTROMAGNETIC DRIVE
Filed May 22, 1946
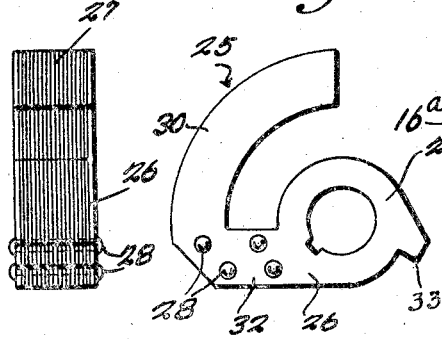
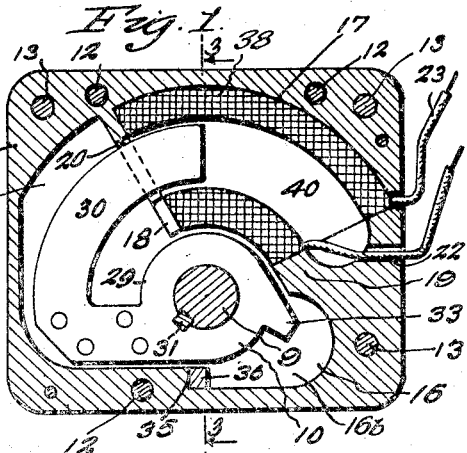
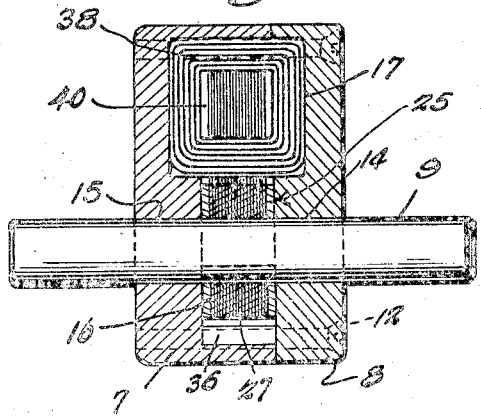
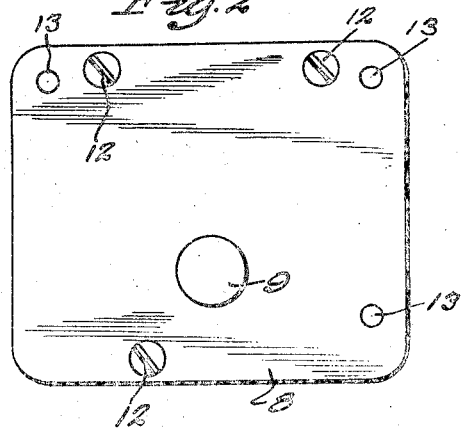
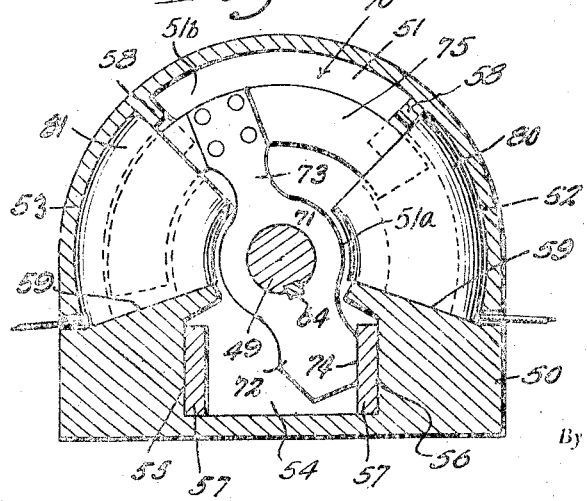
Inventor
WILLIAM A. KAISER Patented Sept. 21, 1948

2,449,901

UNITED STATES PATENT OFFICE 2,449,901

ELECTROMAGNETIC DRIVE

William A. Kaiser, Syracuse, N. Y.

Application May 22, 1946, Serial No. 671,459

2 Claims. (Cl. 175—337)

This invention relates to solenoids and similar electromagnetic devices and it has for its main object to provide a simple device of the type mentioned adapted to produce directly an angular motion or displacement.

Devices for producing an angular motion are known, but utilize, as a rule, solenoid coils of the usual type operating the conventional cores, which are mechanically connected with the lever, arm, gear wheel or the like from which the rotary or angular motion is derived. Such a mechanical connection may be undesirable in many cases, as it is noisy, has sometimes to be especially protected and has lost motion, which is difficult to avoid especially where high power is required. Moreover, as a rule, the power required for the starting or initiating of the movement is materially increased.

The invention eliminates or reduces these disadvantages by using a direct action of the solenoid coil on the core.

According to the invention an arcuate core forming a plunger moves within an arcuate solenoid coil and is mounted on a shaft, the axis of which coincides with the center of the arc around which the core and the solenoid coil are curved. The shaft is thus rotated by direct action of the solenoid on the plunger through an angle which may be selected in accordance with the purpose to be accomplished.

A resilient or elastic stop may be arranged cooperating with a lug or projection on the movable plunger in order to stop.

The arcuate solenoid and coil may be used to produce angular movements in one or both directions of rotation and the arrangement may be such that the movement in both directions is produced by electromagnetic forces.

Special objects and advantages of the invention will be apparent from the following detailed specification in which two embodiments of the invention are described with reference to the accompanying drawing. It has to be understood that these embodiments are examples illustrative of the way in which the invention may be carried into effect. The invention is described in such terms that it will be apparent to those skilled in the art that further embodiments may be constructed by applying the same principles and these embodiments are, therefore, not a departure from but a part of the invention.

In the accompanying drawings:

Figure 1 is an elevational sectional side view of the device.

Figure 2 is an elevational side view.

Figure 3 is an elevational cross sectional view, the section being taken along line 3—3 of Figure 1.

Figure 4 is an elevational front view of the core.

Figure 5 is an elevational side view of the core.

Figure 6 is an elevational sectional side view of a modification of the device.

The device consists of the casing 7 which may be either made in two parts or may be closed by a removable cover or lid 8, screwed onto the casing by means of screw bolts 12. Pins 13 may be provided to secure correct registering of the casing and the lid. The cover and the casing are provided with bores 14, 15, respectively, which serve as journals for the shaft 9. The bores may be lined with suitable material, if desired.

Moreover, the casing is provided with a number of cavities in communication with each other. One of these cavities generally indicated by reference numeral 16 has a central portion surrounding the shaft, an outwardly extending larger section 16a on one side and, a smaller outwardly directed section 16b on the diametrically opposite side. Moreover a smaller peripheral cavity 17 of an annular or toroidal shape is provided adjacent to cavity 16a which is separated from the latter cavity by means of a partition wall 18 provided with an opening 20. The annular or toroidal cavity 17 may be completely closed at one end by a suitable projecting portion 19 of the casing. This portion is provided with small bores 22 for the passage of wires or cable strands 23.

The shaft 9 carries the movable laminated core member 25 which may consist of shields 26 holding a number of thin sheets or lamellae 27 by means of rivets 28. The subdivision of the movable core is preferred in order to avoid the well known disadvantages of massive parts in electromagnetic arrangements, such as transversely directed eddy currents, irregularities of the magnetic lines of force, etc., but the lamination may be omitted where such irregularities are not of significance.

The movable core member 25 comprises a hub member 29, secured on the shaft 9 by means of a key 31, two radially directed portions 32 and 33 extending in opposite directions from said hub member and an arcuate portion 30. This portion is attached to one of the radial portions 32 and is curved along a circle having its centre in the axis of shaft 9. In the modification shown in Figures 1–5 the arcuate portion is an annular sector, the cross section of the annulus being a square or an oblong. However, a toroidal shape with a circular or elliptical cross section and other shapes may be used in many cases. As the center of gravity of the movable member will be located on one side, the said member will return to its position automatically when the casing is used in a vertical position as shown in Figure 1.

The arc covered by the movable core member is dependent on the extent of angular movement to be imparted to it. This extent may vary from around 30° to around 150° in actual practice. In the example shown the core extends along an arc of around 90° and moves through around 60° to 70°.

The second radially directed portion 33 of the number 25 acts as a stop member. It cooperates with a stepped portion 35 inserted between the central portion of the cavity 16 and the outer section 16b. The step may be lined with a rubber block or with a block of another resilient material 36 in order to arrest the core member noiselessly.

Into the annular or toroidal cavity 17 an arcuate solenoid coil 38 is inserted, preferably wound in such a way that the windings are more concentrated on the inside of the arc than on the outside. The coil surrounds a free space 40 into which the plunger or core 25 may enter. The coil is inserted between the partition wall 20 and the projecting portion 19 of the wall of the casing and is firmly held between these wall portions.

The wires 23 supplying the coil with current may enter through the borings 22 of the casing.

When energized the coil will attract the plunger 25 and will draw it into its interior. The plunger then rotates around the shaft without touching any other part until the lug 33 meets the rubber block 36. It operates, therefore, smoothly and noiselessly through a predetermined angle.

A similar solenoid with double action in two directions of rotation is shown in Figure 6.

The construction is essentially that already described. It comprises a shaft 49 held in the casing 50 which is provided with a central cavity generally indicated by reference numeral 51 and consisting of a central section 51a and two adjacent outer sections 51b and 54. The cavity section 51b is flanked by two laterally extending, arcuate, annular or toroidal cavities 52, 53. The cavity section 54 is provided with two straight side walls 55, 56 lined by rubber strips 57.

The two arcuate cavities 52, 53 are separated from the cavity section 51b by means of partition walls 58. On the far side these cavities are closed by portions 59 of the wall of the casing.

The movable plunger 70 in this case comprises a hub member 71 held on shaft 49 by means of a key 64, a radial depending stop member 72 with two stop faces 74, a radial spoke or carrier member 73 and an arcuate core member 75 extending on both sides of the radial member 73. Arcuate solenoid coils 80, 81 are inserted into the lateral arcuate cavities 52, 53 wound as already described, with windings more concentrated on the inside and less concentrated on the outside.

The arcuate portion 75 of the core or plunger 70 and the arcuate length of the solenoid coils is so selected that when the plunger 70 has been drawn into the interior of a coil, it just clears the other coil. This corresponds to an arcuate length approximately equal to two of the three cavities or compartments 51, 52, 53.

As will be seen the energization of one of the solenoid coils draws the plunger either to the left or to the right. The stop faces 74 will arrest the motion silently by means of the rubber lining 57 when the core has been drawn into one of the two coils. The arcuate member, as will be noted, does not touch any other part during its motion. Merely the stop member strikes surfaces specially prepared for this purpose.

This type of arcuate solenoid may be used for movements of the plunger 70 through an angle of around 10° to 90°.

The device may be used for any transmission of rotary or rocking movements by electromagnetic means. Where the solenoid coils cannot be arranged on or close to the device to be operated on account of heat, vapors or the like, the shaft 9 or 49 may be extended to the desired extent. The shaft may also be used for any further mechanical translating movement which may be desired.

It is obvious that the details of the solenoid may be changed in order to meet the special requirements of each case.

I claim:

1. In an electromagnetic device in combination, a rotatable shaft, a casing provided with bores for journalling said shaft and with a number of cavities, one of said cavities being arranged centrally around said shaft with a larger and a smaller section extending outwardly and radially therefrom on opposite sides, a further peripheral cavity having the shape of an arcuate annular sector, a partition wall with an opening between said last named cavity and the adjacent outwardly extended cavity section, a movable member fixed on said shaft comprising a central hub member, two radially extending portions, one of said portions carrying an annular arcuate portion, the other radially extending portion being a stop member, said movable member being housed and movable within the first named cavity, with the radial portion carrying th arcuate portion movable within the larger outer section of the first named cavity and the stop member movable within the smaller radially and outwardly extending cavity section, part of the walls of the latter being provided with a resilient lining and acting as a counterstop, and an arcuate hollow solenoid coil arranged in the peripheral cavity shaped as an arcuate annular sector the curved hollow interior of said coil being centered on the axis of said shaft and adapted to accommodate the annular arcuate portion of the movable member.

2. In an electromagnetic device in combination, a rotatable shaft, a casing provided with a number of cavities, one of said cavities having a cylindrical central section around the shaft axis and two radially and outwardly extending sections at opposite sides, further cavities having the shape of annular sectors flanking one of said outwardly extending cavity sections, partition walls with openings between the last named cavity section and the adjacent flanking cavities, hollow solenoid coils curved along an arc centered on the axis of the shaft, arranged within said flanking cavities, a movable member mounted on said shaft, consisting of a hub member and two radially extending portions on opposite sides of the same, one of said portions being a stop member, the other carrying an arcuate annular core, adapted to enter the hollow interior of the coils, of an arcuate length exceeding the combined length of a flanking cavity and the adjacent radially and outwardly extending cavity section, the stop member moving within the second radially and outwardly extending section provided with two cushioned straight walls acting as counterstops for said stop member for the movement in both directions.

WILLIAM A. KAISER.

REFERENCES CITED

The following references are of record in the file of this patent:

UNITED STATES PATENTS

| Number | Name | Date |
| --- | --- | --- |
| 479,828 | Mumford | Aug. 2, 1892 |
| 802,945 | Waterman | Oct. 24, 1905 |
| 1,585,216 | Tugendhat | May 18, 1926 |
| 2,337,375 | Cramer | Dec. 21, 1943 |
| 2,408,712 | Waltman | Oct. 1, 1946 |